United States Patent
Van Dest

[15] 3,690,734
[45] Sept. 12, 1972

[54] TRACTOR CONTROLLED TRAILER BRAKE
[72] Inventor: Jean Claude Van Dest, Ris-Orangis, France
[73] Assignee: Massey-Ferguson Services N.V., Curacao, Netherlands
[22] Filed: Dec. 8, 1970
[21] Appl. No.: 96,194

[30] Foreign Application Priority Data
   Dec. 18, 1969   Great Britain..........61,822/69

[52] U.S. Cl.....................................................303/7
[51] Int. Cl. ..............................................B60t 13/00
[58] Field of Search....................................303/7, 29

[56] References Cited
   UNITED STATES PATENTS
3,543,512   1/1969   England et al.................303/7

Primary Examiner—Evon C. Blunk
Assistant Examiner—H. S. Lane
Attorney—Gerhart, Greenlee & Farris

[57] ABSTRACT

A tractor hydraulic braking system includes hydraulic connections from a tractor auxiliary hydraulic power source to the trailer brakes. A control valve is responsive to tractor brake application forces to control hydraulic power fluid flow to the trailer brakes in proportion to tractor brake forces.

10 Claims, 9 Drawing Figures

Inventor
JEAN CLAUDE VAN DEST

Inventor
JEAN CLAUDE VAN DEST
BY
Gerhardt, Greenlee & Farris
Attorneys

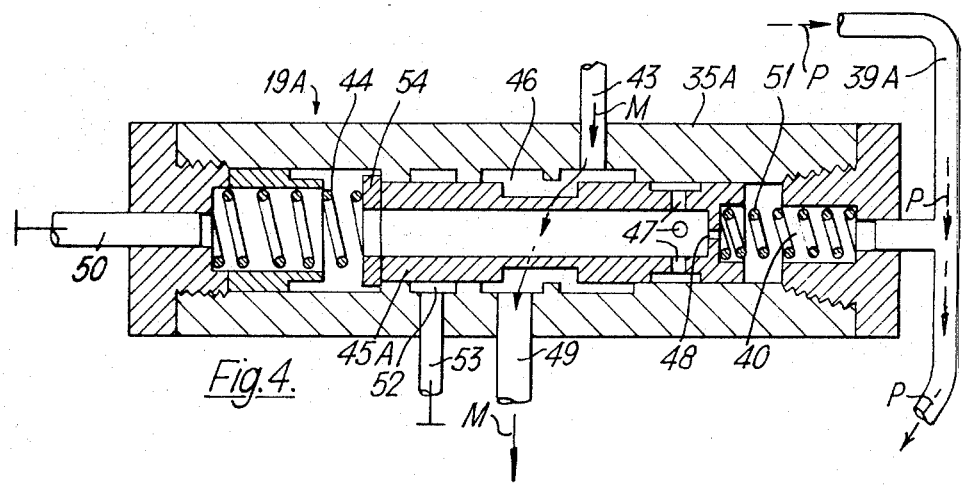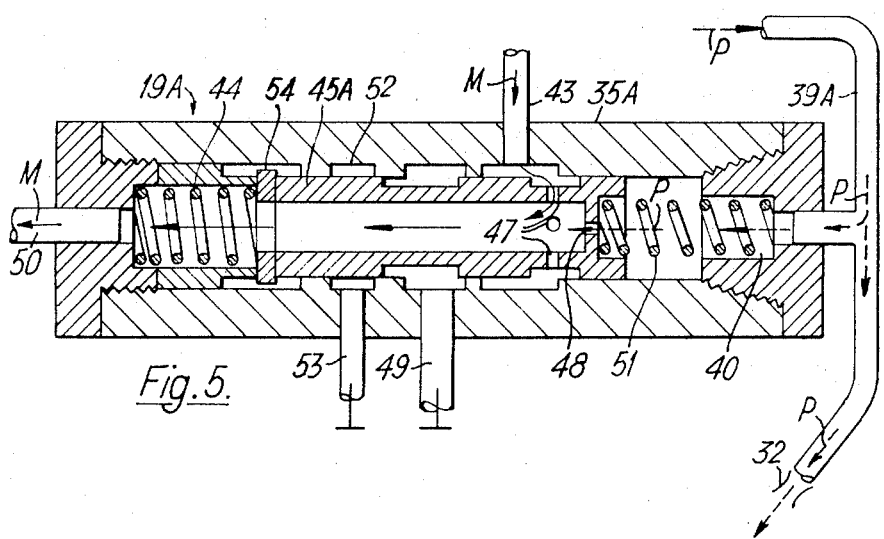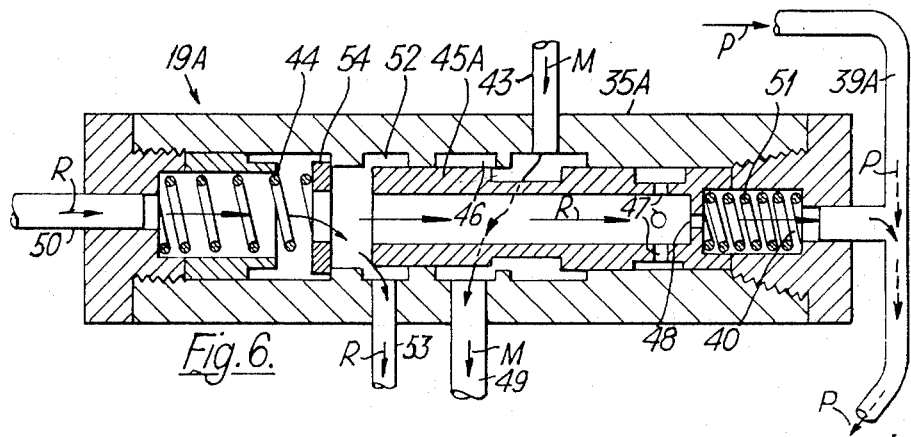

Inventor
JEAN CLAUDE VAN DEST
BY
Gerhardt, Greenlee & Farris
Attorneys

TRACTOR CONTROLLED TRAILER BRAKE

This invention relates to apparatus for controlling supply of hydraulic fluid to a hydraulically actuable brake on a trailer.

The invention is particularly concerned with the provision of such apparatus in a tractor or towing vehicle equipped with supply means for providing hydraulic fluid under pressure for auxiliary services.

According to the present invention, there is provided, for use in a tractor or towing vehicle equipped with supply means for providing hydraulic fluid under pressure for auxiliary services; apparatus for controlling supply of hydraulic fluid to a trailer hydraulic brake, the said apparatus comprising a pilot-operated distributing valve having an inlet for hydraulic fluid from the supply means and an outlet for the passage of hydraulic fluid from the supply means to a trailer hydraulic brake, conduit means in communication with a pilot fluid chamber of the distributing valve and adapted to convey pilot fluid from a source to discharge through a discharge control valve adapted to vary pilot fluid pressure in accordance with variation in force applied to actuate a brake on the tractor or towing vehicle.

Further, according to the present invention, there is provided, for use in a tractor or towing vehicle equipped with supply means for providing hydraulic fluid under pressure for auxiliary services, apparatus for controlling supply of hydraulic fluid to a trailer hydraulic brake, the said apparatus comprising a pilot-operated distributing valve having an inlet for hydraulic fluid from the supply means and an outlet for the passage of hydraulic fluid from the supply means to a trailer hydraulic brake, conduit means in communication with a pilot fluid chamber of the distributing valve and with pilot fluid control means adapted to vary pilot fluid pressure in accordance with variation in force applied to actuate a brake on the tractor or towing vehicle, and a restricted passage placing the pilot fluid chamber in communication with the said outlet of the distributing valve.

Still further, according to the present invention, there is provided, for use in a tractor or towing vehicle equipped with supply means for providing hydraulic fluid under pressure for auxiliary services, apparatus for controlling supply of hydraulic fluid for a trailer hydraulic brake, the said apparatus comprising a flow-dividing valve having an inlet for connection to the tractor or towing vehicle supply means, and two outlets of which one is a main outlet for flow therethrough of hydraulic fluid for auxiliary services and for initial trailer brake actuation and of which the other is a pilot outlet for flow therethrough of pilot hydraulic fluid at a predetermined flow rate, a spring-returned pilot-operated change-over valve providing in the returned position communication between the main outlet and a first connection for auxiliary services and providing in the operated position communication between the main outlet and a second connection for a trailer hydraulic brake with simultaneous closing of the first connection, the change-over valve including a restrictor placing pilot fluid in communication with the second connection so as to permit spring return when fluid pressure at the second outlet balances pilot pressure, and a control valve adapted to vary pressure of fluid flowing through the pilot outlet in accordance with variation in force applied to actuate the brakes of the tractor or towing vehicle.

Still further, according to the present invention, there is provided a tractor or towing vehicle equipped with supply means for providing hydraulic fluid under pressure for auxiliary services, the tractor or towing vehicle incorporating apparatus as aforesaid for controlling supply of hydraulic fluid to a trailer hydraulic brake.

Embodiments of the invention will now be described, by way of example, with reference to the drawings in which.

Figure 1:
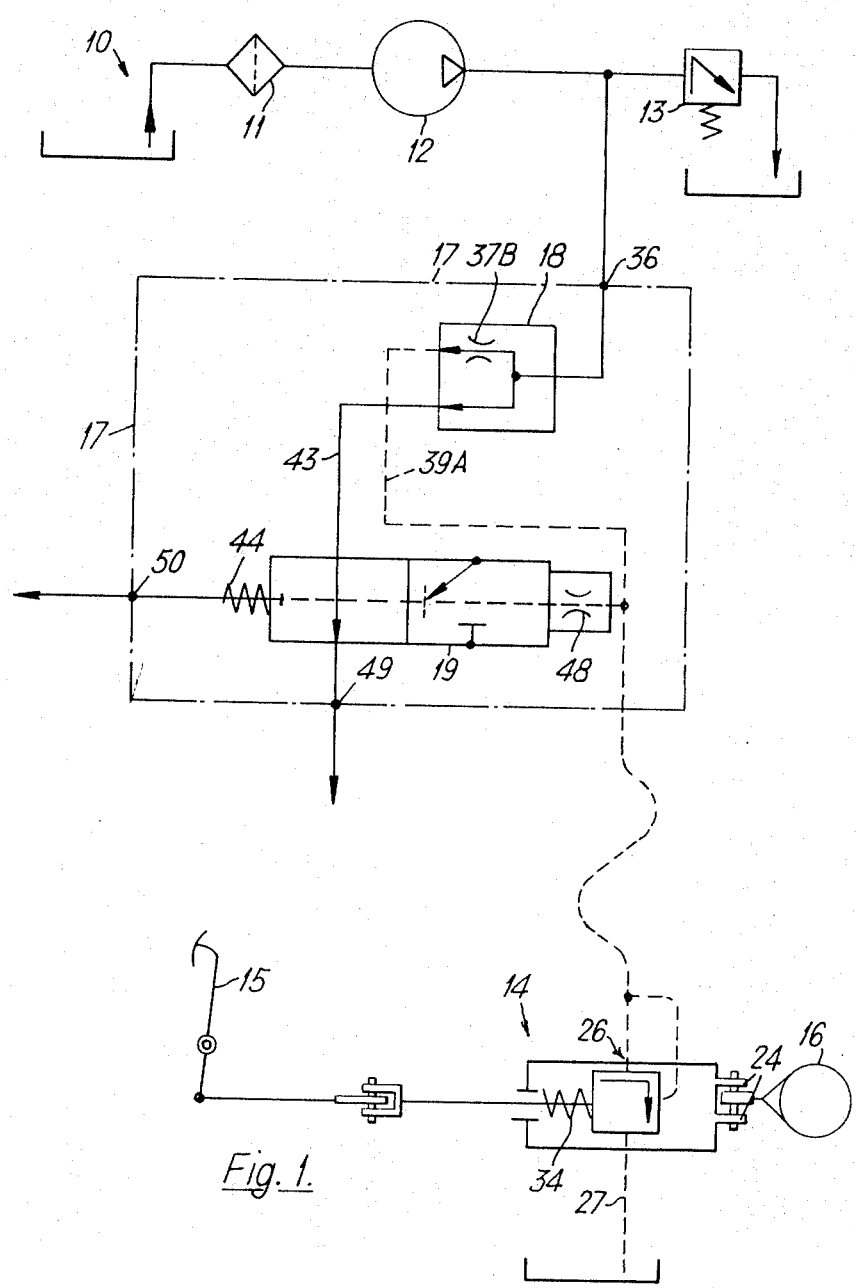
FIG. 1 is a hydraulic circuit diagram of apparatus in accordance with the invention.
Figure 2:
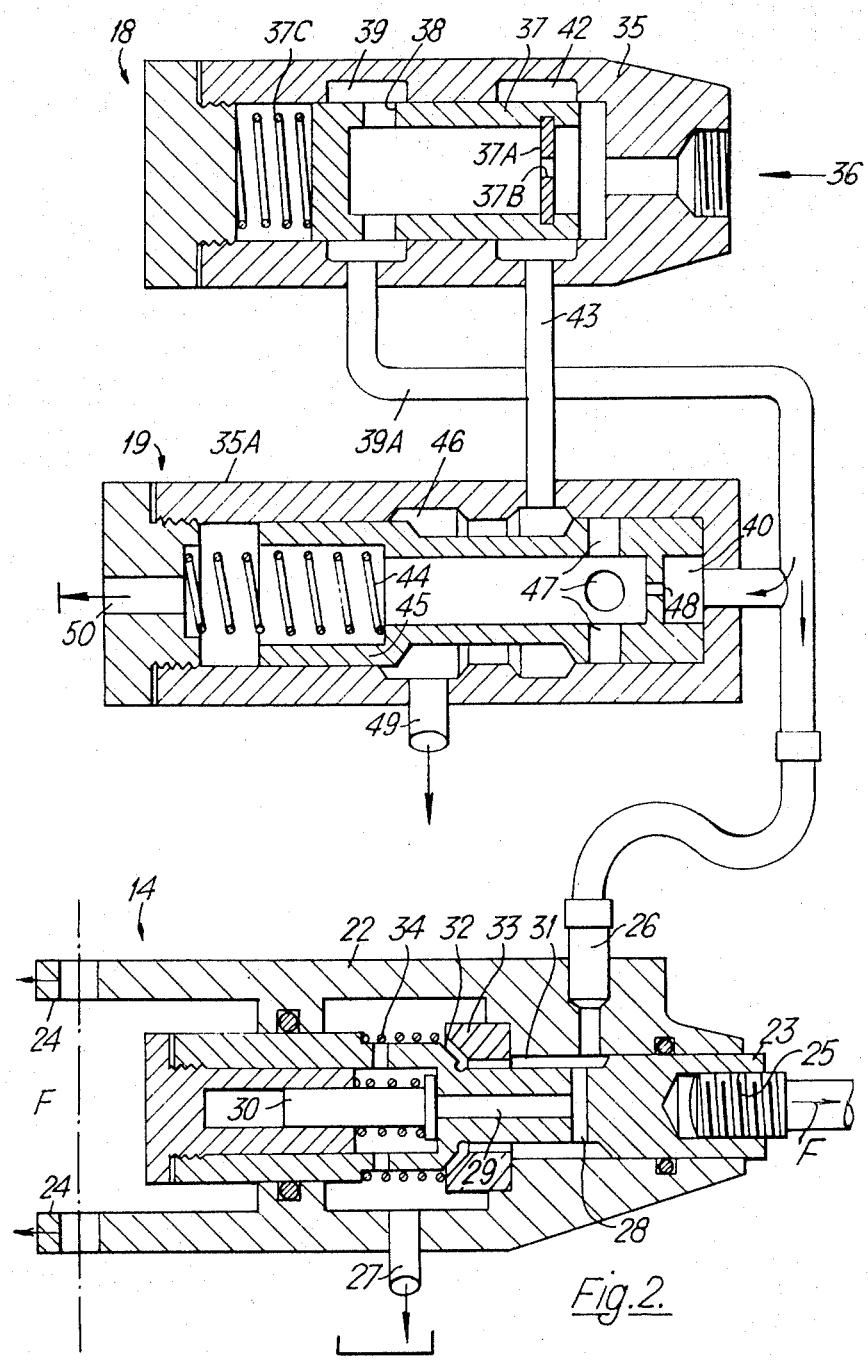
FIG. 2 is a diagrammatic representation of a practical embodiment of the arrangement of FIG. 1 showing parts in sectional elevation.
Figure 3:
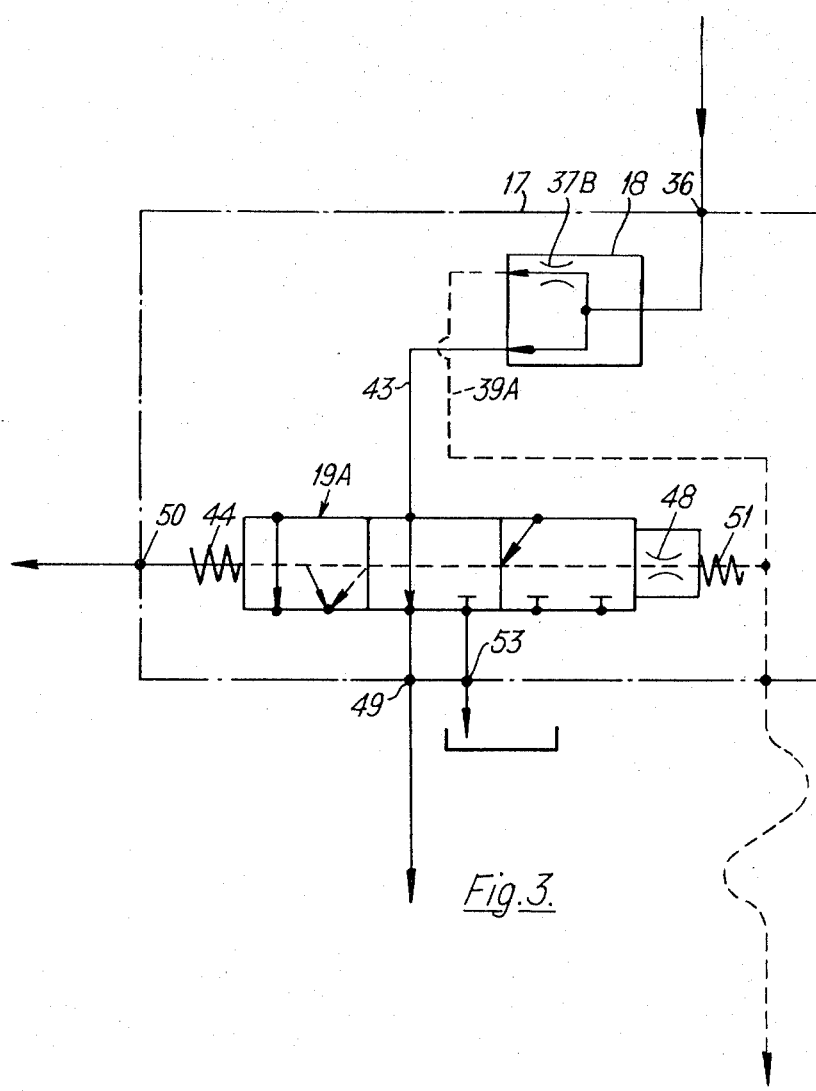
Figure 7:
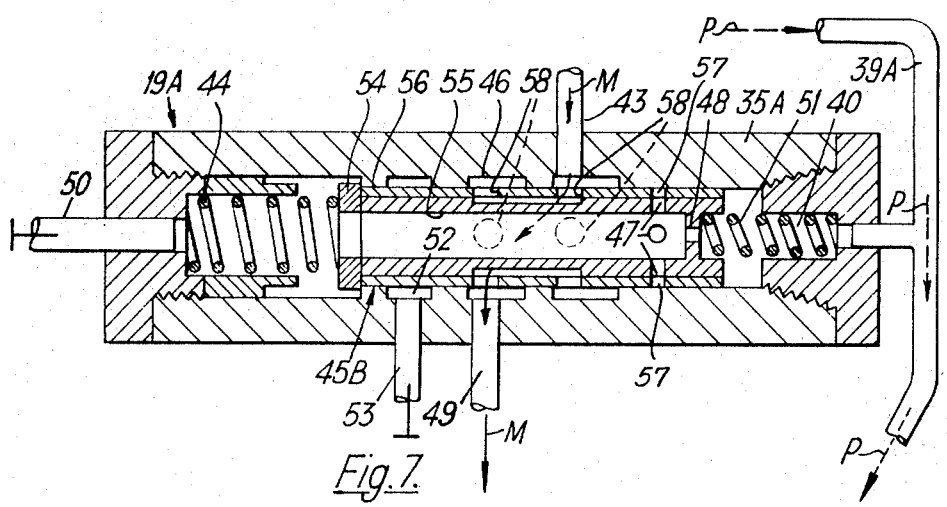
Figure 8:
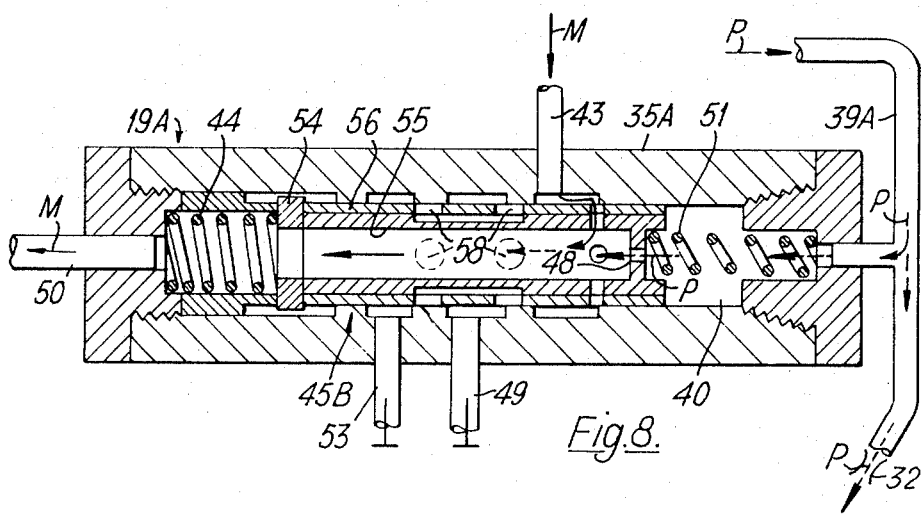
Figure 9:
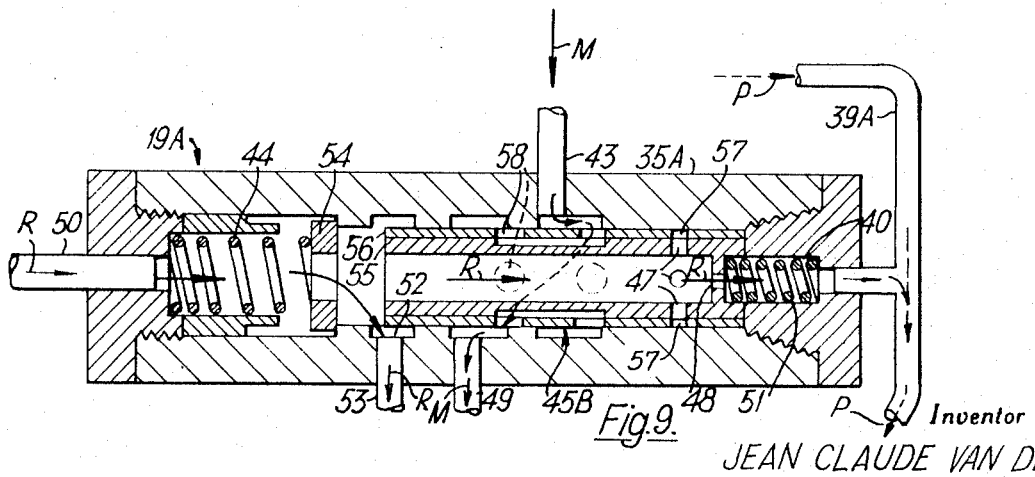

FIG. 3 is a hydraulic circuit diagram similar to a part of FIG. 1, but showing a modification; and FIGS. 4, 5 and 6 are respectively sectional elevations showing different operational conditions of a distributing valve which is a modification of a distributing valve shown in FIGS. 1 and 2, and is a practical embodiment of the distributing valve shown in FIG. 3; and FIGS. 7, 8 and 9 are respectively sectional elevations showing different operational conditions of a distributing valve similar to that of FIGS. 4, 5 and 6, but showing a modified valve spool construction.

The apparatus about to be described is intended for incorporation in a tractor having a mechanical braking system including a foot pedal and associated linkage connecting the foot pedal with the wheel brakes; and an auxiliary hydraulic pump or independent power take-off which operates so long as the tractor engine is running and which is not disengageable.

In FIG. 1 of the drawings, the tractor auxiliary hydraulic system is generally indicated at 10 and includes a filter 11, a pump 12 and a pressure relief valve 13. A pilot fluid pressure control valve 14 is connected mechanically in series between normally adjacent members of the tractor braking system where a foot-pedal is indicated at 15 and the wheel brakes at 16. A valve assembly 17 includes a flow-dividing valve 18, and a distributing valve 19.

The construction of the control valve 14 is illustrated in FIG. 2. A valve body 22 and a cooperating spool 23 constitute relatively movable elements adapted respectively for connection to normally adjacent members of the tractor brake system linkage, the body 22 having integrally formed connecting lugs 24 for pin-jointing to a brake lever member, the spool 23 having an internally threaded socket 25 for connection with a brake rod member operable by means of the pedal 15. The body 22 has an inlet 26 for pilot fluid and an outlet 27 to sump or reservoir, connections thereto being by way of flexible pipes or hose. Adjacent the inlet 26, the spool 23 has radial ports 28 leading to a central passage 29 which may be connected with outlet 27 by way of a spring-loaded pressure relief valve 30. Also adjacent the inlet 26, the spool 23 and the body 22 define an annular space 31 which communicates with the outlet 27 by way of a seating at 32 constituted by a shoulder on the spool 23 and cooperating insert 33. The seating 32 constitutes a variable restrictor to flow of pilot fluid through the control valve 14, characteristics in respect of pressure-drop across the seating 32 in relation to a braking force F (see arrows F, FIG. 2) being determined by the cross-sectional area of the annular space 31. A compression spring 34 serves to urge the body 22 and spool 23 so as to adopt the "minimum pressure drop" condition and takes up "free-play" when the brake pedal 15 is released.

FIG. 2 also illustrates the arrangement and construction of the flow-dividing valve 18 and the distributing valve 19 in the assembly 17. A body 35 of the flow-dividing valve 18 has an inlet 36 coaxial with which a spring-loaded restrictor spool 37 having radial ports 38 is slidable in relation to a first gallery 39 which communicates with one end of the distributing valve 19 by way of a passage 39A leading to chamber 40 and also leading to the inlet 26 of the control valve 14. The radial ports 38 constitute an outlet from the hollow interior of the spool 37, flow of fluid to the said interior from the inlet 36 being controlled by an insert 37A having an orifice 37B of a predetermined size. A second gallery 42 communicates with a passage 43 for carrying a main flow of fluid to the change-over valve 19. The gallery 42 is arranged adjacent the entrance to the interior of the spool 37 and is uncovered to allow main flow to the passage 43 so long as fluid pressure at the inlet 36 is sufficient to overcome the force in a spool-loading spring 37C. The flow-dividing valve 18 is thus adapted to provide a predetermined constant reduced flow-rate of hydraulic fluid to serve as pilot fluid for operating the change over valve 19. In an example, the flow-divider valve 18 would pass a main flow of 7.2 gallons per minute, and a pilot flow of 0.8 gallons per minute.

The distributing valve 19 in FIG. 2 is a spring-returned two-position valve and consists of a return spring 44 and a hollow spool 45 slidable in a body 35A in relation to a gallery 46. Adjacent the "pilot end" of the spool 45 there are provided radial ports 47 and a restrictor orifice 48, the latter providing a restricted flow path between the pilot chamber 40 and the hollow interior of the spool 45. The gallery 46 communicates with a first connection 49 for auxiliary services and the interior of the spool 45, being open at the end remote from the chamber 40, communicates with a second connection 50 for a trailer hydraulic brake system. The connection 50 may incorporate a standard self-sealing coupling. The valves 18 and 19 may be constructed as a single unit, that is they may have a common body (35 and 35A).

Operation of the apparatus is as follows:

Hydraulic fluid from the pump 12 flows to the inlet 36 of the flow-divider valve 18 wherefrom a main flow passes to the change over valve 19 and thence to the connection 49 for auxiliary services. Pilot flow from the divider valve 18 passes to the inlet 26 of the control valve 14 and thence, by way of the seating 32, to sump through the control valve outlet 27. Pilot flow passes also to the chamber 40 of the change-over valve 19, but does not operate this valve so long as pressure drop across the seating 32 is insufficient to overcome the force of the return spring 44 in the change over valve 19. Thus, the ports 47 adopt the position shown in FIG. 2 and the connection 50 is isolated from main fluid pressure. It should be noted that low pilot pressure in chamber 40 is not sufficient to apply the trailer brakes by way of the restrictor 48. When applying the tractor brakes, the control valve 14 is operated under tension by the opposed forces F giving rise to an immediate increase in pressure drop across the seat 32 which, in effect, raises the pilot pressure in chamber 40 causing the change-over spool 45 to move to the left in FIG. 2 bringing the ports 47 into registration with the gallery 46 and so directing main fluid to the trailer brakes through connection 50. The supply to auxiliary connection 49 is simultaneously closed so that any operating auxiliary equipment is temporarily stopped, but without loss of pressure. When the trailer brake pressure balances the increased pilot pressure, the return spring 44 moves the change-over spool 45 rightwards in FIG. 2, the orifice 48 permitting transfer of pilot fluid from chamber 40 to the interior of spool 45 and also permitting pilot pressure to sustain actuation of the trailer brakes. When the spool 45 has resumed the position shown in FIG. 2, the main flow is reconnected to the auxiliary connection 49 so that operation of auxiliary equipment may continue while the trailer brakes remain applied. Upon release of the tractor brakes, the control valve 14 resumes its relaxed condition with low pressure drop across seat 32, fluid being returned from the trailer braking system by way of orifice 48.

In FIGS. 3 to 9, parts corresponding with those in FIGS. 1 and 2 are given the reference numerals used in FIGS. 1 and 2. In FIG. 3, the distributing valve 19A in the valve assembly 17 is modified so as to allow return of hydraulic fluid from the trailer brakes to sump or reservoir without all of the returned fluid having to flow through the restrictor 48. The objective of this modification is to improve trailer brake pull off response when the tractor brake pedal 15 is released. This objective is attained by providing in the distributing valve 19A an additional facility whereby the spool 45A can move rightwards (FIGS. 4 to 6) from a central or normally spring-returned position to a pressure-relieving position governed by an additional compression spring 51. In the pressure relieving position, an additional gallery 52 is uncovered by the spool 45A to allow most of the returning fluid to flow directly to sump or reservoir through an additional outlet port 53. Apart from this additional facility, the distributing valve 19A operates as described herein with reference to FIGS. 1 and 2. In FIGS. 4 to 9, flow of hydraulic fluid from the tractor pump 12 is indicated by arrowed lines M; pilot flow from the divider valve 18 is indicated by arrowed lines P; and returning flow from the trailer brakes is indicated by arrowed lines R. In FIG. 4, the tractor brakes 16 are released; there is no restriction to flow of pilot fluid; the valve spool 45A is in a central or spring-returned position (by spring 44) placing inlet 43 in communication with auxiliary services through outlet 49. In FIG. 5, the tractor brakes are newly applied; the restriction 32 has produced a back-pressure which operates in chamber 40 to move the spool 45A leftwards cutting off outlet 49 and placing outlet 50 to the trailer brakes in communication with inlet 43. From this condition, and while the tractor brakes 16 remain applied, the spool 45A returns, under the action of spring 44, to its central position as soon as fluid pressure in the trailer brake lines balances fluid pressure in the chamber 40. Thus, trailer braking pressure is sustained by, and is proportional to pressure in the pilot flow P, and the flow M to auxiliary services is interrupted only momentarily. In FIG. 6, the tractor brakes 16 are newly released; the restriction 32 is removed and consequently fluid pressure in the trailer brake lines moves the spool 45A rightwards, overcoming the spring 51, and opening the outlet 53 to sump. From this condition, the spool 45A will move to its central position under the action of spring 51 as soon as flow R of returning fluid reduces to a negligible amount. In FIGS. 4 to 6, the spring 51 is weak compared with spring 44. Accordingly, a floating collar 54 is interposed between the spring 44 and the spool 45A, the rightward travel of the collar 54 being limited by a stepped portion in the bore of the body 35A.

The distributing valve shown in FIGS. 7, 8 and 9 operates in the manner described with reference to FIGS. 4, 5 and 6. The modification in FIGS. 7 to 9 consists of an alternative construction of valve spool 45B whereby the spool 45B is made from mutually concentric mating sleeves 55 and 56. The inner sleeve 55 carries the ports 47, the restrictor 48, and is provided with an annular recess for placing the inlet 43 in communication with the outlet 49, all as described herein with reference to FIGS. 2 to 6. The outer sleeve 56 is secured to the inner sleeve 55 and is provided with ports 57 and 58 giving fluid access to the ports 47 and the said annular recess respectively.

In further modifications of the foregoing embodiments, the control valve 14 is adapted to operate under compression rather than tension; additionally, or alternatively, the control valve 14 is adapted to respond to hydraulic rather than mechanical actuation for the purpose of incorporation in tractors or towing vehicles having hydraulic braking systems.

I claim:

1. In combination with a tractor having a brake and supply means for providing hydraulic fluid under pressure for auxiliary services, apparatus for controlling supply of hydraulic fluid to a trailer hydraulic brake comprising: a pilot-operated distributing valve having an inlet for hydraulic fluid from the supply means, a pilot fluid chamber, a pilot fluid source and an outlet for the passage of hydraulic fluid from the supply means to the trailer hydraulic brake, a discharge control valve, and conduit means in communication with the pilot fluid chamber for conveying pilot fluid from the pilot fluid source through the discharge control valve to vary pilot fluid pressure in accordance with variation in force applied to actuate the tractor brake.

2. The combination of claim 1, wherein the discharge control valve includes mutually cooperating relatively movable elements comprising a variable restrictor for pilot fluid flow therethrough enabling the discharge control valve to serve as a sensing link in the tractor brake linkage.

3. The combination of claim 2, wherein the discharge control valve includes a relief valve for relieving excessive pilot fluid pressure.

4. The combination of claim 1, wherein the conduit means include flexible conduits connected respectively to the pilot fluid chamber inlet and to a discharge outlet of the discharge control valve to enable mounting of the discharge control valve in the tractor brake linkage and remote from the distributing valve and/or the said supply means.

5. The combination of claim 2, wherein the distributing valve includes a restrictor interconnecting the pilot fluid chamber with the outlet of the distributing valve.

6. The combination of claim 1, wherein the distributing valve comprises a spring-returned change over valve having a first position connecting the supply means with a second outlet to auxiliary services, and a second position connecting the inlet to the first outlet and disconnecting the inlet from the second outlet.

7. The combination of claim 1, wherein the distributing valve comprises a spring-loaded three-position valve having a first spring-returned position connecting the supply means with a second outlet to auxiliary services, a second pilot-operated position connecting the inlet to the first outlet and disconnecting the inlet from the second outlet, and a third pressure-relieving position connecting the inlet and the second outlet and connecting the first outlet with a third outlet to sump to exhaust the hydraulic fluid from the trailer brake.

8. The combination of claim 1, wherein the pilot fluid source includes a flow-dividing valve having an inlet connected to the supply means, a main outlet connected to the distributing valve inlet, and a pilot outlet connected to the conduit means.

9. The combination of claim 1, wherein the conduit means include a restricted passage.

10. In combination with a tractor having a brake and supply means for providing hydraulic fluid under pressure for auxiliary services, apparatus for controlling supply of hydraulic fluid for a trailer hydraulic brake comprising: a flow-dividing valve having an inlet connected to the supply means, a main outlet and a pilot outlet sized for a predetermined flow rate, a spring-returned pilot-operated change over valve having a returned position connecting the main outlet and the auxiliary services and an operated position connecting the main outlet and the trailer hydraulic brake and disconnecting the main outlet from the auxiliary services, the change over valve including a restrictor connecting the pilot outlet and the auxiliary services to enable spring return of the change-over valve when fluid pressure at the hydraulic services balances pilot pressure, and a selectively variable control valve connected to the pilot outlet to vary pilot outlet pressure in accordance with variation in force applied to actuate the brakes of the tractor.

* * * * *